US012709692B2

(12) United States Patent
Tsujii et al.

(10) Patent No.: US 12,709,692 B2
(45) Date of Patent: Aug. 18, 2026

(54) INK JET RECORDING METHOD AND INK JET RECORDING APPARATUS

(71) Applicant: CANON KABUSHIKI KAISHA, Tokyo (JP)

(72) Inventors: Ryo Tsujii, Tokyo (JP); Hideki Yamakami, Kanagawa (JP); Satoshi Takebayashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 204 days.

(21) Appl. No.: 18/514,283

(22) Filed: Nov. 20, 2023

(65) Prior Publication Data

US 2024/0182731 A1 Jun. 6, 2024

(30) Foreign Application Priority Data

Nov. 25, 2022 (JP) ................................ 2022-187864
Nov. 7, 2023 (JP) ................................ 2023-190123

(51) Int. Cl.
*C09D 11/30* (2014.01)
*B41J 2/01* (2006.01)
(Continued)

(52) U.S. Cl.
CPC ................ *C09D 11/30* (2013.01); *B41J 2/01* (2013.01); *B41J 2/2107* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598;
(Continued)

(56) References Cited

U.S. PATENT DOCUMENTS 6,086,197 A * 7/2000 Kubota ...................... B41J 2/15 347/100
12,398,287 B2 * 8/2025 Takebayashi ........ C09D 11/326
(Continued)

FOREIGN PATENT DOCUMENTS

CN 102746728 A 10/2012
EP 4239032 A1 9/2023
(Continued)

*Primary Examiner* — Manish S Shah
(74) *Attorney, Agent, or Firm* — Canon U.S.A., Inc. IP Division

(57) ABSTRACT

There is provided an ink jet recording method for recording an image on a recording medium with an aqueous ink and an aqueous reaction liquid containing a reactant that reacts with the aqueous ink. The aqueous ink contains a coloring material that is dispersed by the action of an anionic group. The aqueous reaction liquid contains a water-soluble cationic resin having a structure of a quaternary ammonium salt, and a polyvalent metal salt. The mass ratio of the amount of cationic resin (% by mass) contained to the amount of polyvalent metal salt (% by mass) contained in the aqueous reaction liquid is 0.08 times or more to 0.80 times or less. The amount of water absorbed by the recording medium from the start of contact to 30 $msec^{1/2}$ in the Bristow method is 10 $mL/m^2$ or less.

18 Claims, 2 Drawing Sheets

(51) Int. Cl.

| | |
|---|---|
| ***B41J 2/21*** | (2006.01) |
| ***B41M 5/00*** | (2006.01) |
| ***C09D 11/102*** | (2014.01) |
| ***C09D 11/322*** | (2014.01) |
| ***C09D 11/38*** | (2014.01) |
| ***C09D 11/40*** | (2014.01) |
| ***C09D 11/54*** | (2014.01) |

(52) U.S. Cl.
CPC .......... *C09D 11/102* (2013.01); *C09D 11/322* (2013.01); *C09D 11/38* (2013.01); *C09D 11/40* (2013.01); *C09D 11/54* (2013.01); *B41M 5/0017* (2013.01)

(58) Field of Classification Search
CPC ......................... B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2006/0125895 | A1* | 6/2006 | Nito | C09D 11/54 347/100 |
| 2009/0234067 | A1* | 9/2009 | Kariya | C09D 11/54 524/610 |
| 2009/0258203 | A1 | 10/2009 | Aoyama | |
| 2010/0201737 | A1* | 8/2010 | Kariya | C09D 11/32 347/21 |
| 2016/0024323 | A1* | 1/2016 | Tamai | C09D 11/322 106/31.6 |
| 2016/0311235 | A1* | 10/2016 | Takeuchi | B41J 2/01 |
| 2021/0246327 | A1* | 8/2021 | Zheng | C09D 11/54 |

FOREIGN PATENT DOCUMENTS

| | | | |
|---|---|---|---|
| JP | 2010023265 | A | 2/2010 |
| JP | 2017043727 | A | 3/2017 |
| JP | 2020104487 | A | 7/2020 |
| WO | 2020046341 | A1 | 3/2020 |
| WO | 2021201873 | A1 | 10/2021 |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

In recent years, ink jet recording methods have been increasingly used in a field called sign and display, such as the printing of posters and large-format advertisements. Ink jet recording apparatuses used in this field can be characterized in that they have a wider recording area than ink jet recording apparatuses for home use. In addition, images need to attract attention; thus, inks that can record an image having high color development are required.

In the field of sign and display, non-absorbent recording media whose surfaces have substantially no ink absorbency and which are composed of, for example, vinyl chloride (PVC) or polyethylene terephthalate (PET) are often used. Thus, it is necessary to inhibit the blurring of an image on a non-absorbent recording medium. Hereinafter, a recording medium whose surface has substantially no ink absorbency is also referred to as a "non-absorbent recording medium". In an ink jet recording method of recording on a non-absorbent recording medium, it is important to inhibit blurring by inhibiting ink dots from being repelled on the recording medium. For this purpose, it is necessary to rapidly thicken and fix the ink after the ink is applied to the recording medium.

As a method of recording on a non-absorbent recording medium, a recording method is known in which a solvent-based ink containing an organic solvent as a main component or a curable ink containing a polymerizable monomer is used. From the viewpoints of environmental impact and safety, there has recently been an increasing need for a recording method in which recording can be performed on a non-absorbent recording medium using an aqueous ink.

Examples of methods of recording on non-absorbent recording media using aqueous ink include a method in which water in the ink evaporates on a surface of a non-absorbent recording media; and a method in which a reaction liquid is used to aggregate the components of the ink. The former is advantageous from the viewpoint of running cost because it is not necessary to provide a unit configured to apply a reaction liquid, but is inferior in productivity because it is necessary to reduce the printing speed. For this reason, a method using a reaction liquid has been studied.

Some recording media have glossy surfaces. Such recording media are also required to have high image clarity from the viewpoint of recording high-quality images. The term "image clarity" refers to the sharpness of an image when the image is projected on the surface of a recorded image. When the image clarity is low, the image appears blurred. When the image clarity is high, the image appears clear.

To form an image excellent in color development and image clarity by using a reaction liquid, it is important to select a reactant in the reaction liquid. Examples of the types of reactant that are typically used include organic acids, cationic resins and polyvalent metal salts. Each of these reactants has its advantages and disadvantages. As described in Japanese Patent Laid-Open No. 2020-104487 and No. 2010-023265, the use of a combination of types of reactants has been studied.

The inventors have evaluated the color development and image clarity of an image recorded using a reaction liquid containing a combination of reactants described in Japanese Patent Laid-Open No. 2020-104487 and No. 2010-023265 and have found that although the use of the combination of a cationic resin and a polyvalent metal salt has an effect on the color development of an image to some extent, there is room for improvement in the image clarity of the image.

SUMMARY OF THE INVENTION

The present invention provides an ink jet recording method by which an image excellent in color development and image clarity can be recorded even when recording is performed on a non-absorbent recording medium with a reaction liquid. The present invention also provides an ink jet recording apparatus for use in the ink jet recording method.

One aspect of the present invention is directed to providing an ink jet recording method for recording an image on a recording medium with an aqueous ink and an aqueous reaction liquid containing a reactant that reacts with the aqueous ink. The method includes a reaction liquid application step of applying the aqueous reaction liquid to the recording medium, and an ink application step of applying the aqueous ink in such a manner that the aqueous ink overlaps with at least part of a region of the recording medium to which the aqueous reaction liquid is applied. The aqueous ink contains a coloring material that is dispersed by action of an anionic group. The aqueous reaction liquid contains a water-soluble cationic resin having the structure of a quaternary ammonium salt, and a polyvalent metal salt. The mass ratio of the amount of the cationic resin (% by mass) contained to the amount of the polyvalent metal salt (% by mass) contained in the aqueous reaction liquid is 0.08 times or more to 0.80 times or less. The amount of water absorbed by the recording medium from the start of contact to 30 $msec^{1/2}$ in the Bristow method is 10 $mL/m^2$ or less.

Further features of the present invention will become apparent from the following description of exemplary embodiments with reference to the attached drawings.

DESCRIPTION OF THE EMBODIMENTS

Figure 1:
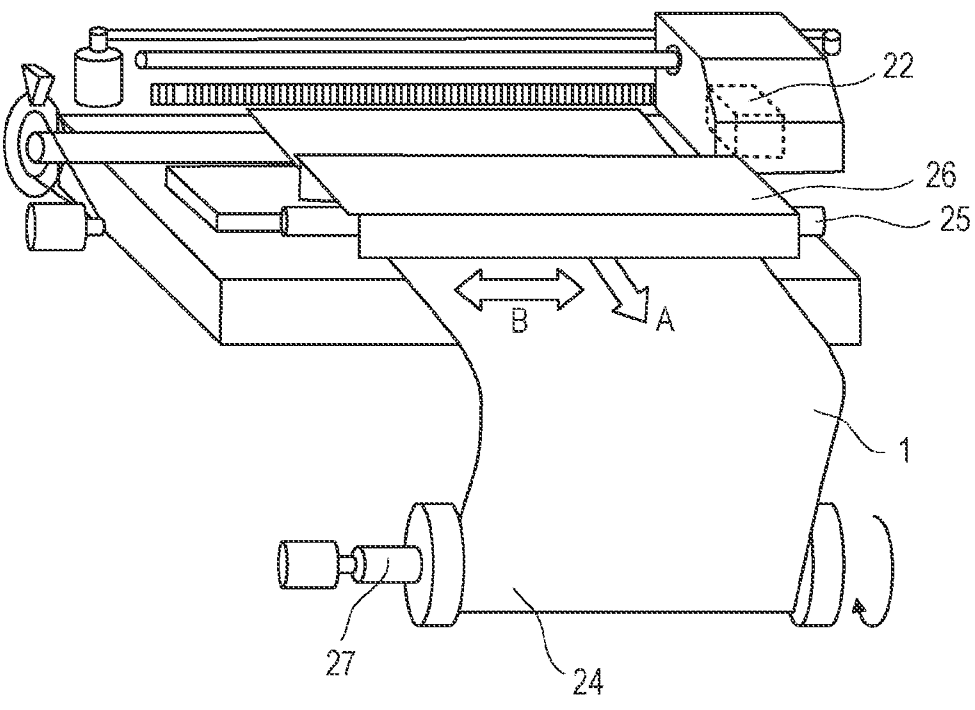
FIG. 1 is a schematic perspective view illustrating an ink jet recording apparatus according to an embodiment of the present invention.

The present invention will be described in more detail below with reference to embodiments. In an embodiment of the present invention, when a compound is a salt, the salt is dissociated into ions in the ink, but for convenience, it is expressed as "containing a salt". An aqueous ink and an aqueous reaction liquid for ink jet recording are also referred to simply as an "ink" and a "reaction liquid", respectively. The physical property values are values at room temperature (25° C.) unless otherwise specified. The term "(meth)acrylic acid" includes acrylic acid and methacrylic acid. The term "(meth)acrylate" includes an acrylate and a methacrylate.

When an image is recorded on a non-absorbent recording medium using a reaction liquid, unlike an absorbent recording medium, the components of the ink hardly permeate into the recording medium, and thus the unreacted reactant remains on the surface of the recording medium. For this reason, when a reaction liquid containing an organic acid or a polyvalent metal salt alone as a reactant is used, the reactant remaining on the surface of the recording medium is precipitated, and the crystal grows, thereby deteriorating the color development of an image. A cationic resin has a plurality of cationic sites that can react with the components of the ink. Thus, in the case where a reaction liquid containing a cationic resin alone is used as a reactant, a large aggregate is formed when the reaction liquid reacts with a coloring material in the ink and is present on the surface of the recording medium. The unevenness of the aggregate results in insufficient smoothness of the image, deteriorating the image clarity of the image.

The inventors have conducted studies on a reaction liquid containing a combination of an organic acid and a polyvalent metal salt in consideration of the characteristics of each reactant. With the above configuration, for example, it was anticipated that even if the organic acid was precipitated, the presence of polyvalent metal ions derived from the polyvalent metal salt would make it difficult for the organic acid to aggregate with each other, inhibiting the crystal growth of the precipitated organic acid and recording an image with excellent color development and image clarity. However, the crystal growth of the deposited reactant was not inhibited, thus resulting in insufficient color development of the image. This is presumably because, even in the case of the reaction liquid containing a plurality of types of reactants, only the presence of the polyvalent metal ions derived from the polyvalent metal salt did not inhibit the crystal growth due to the electrostatic interaction of the other reactants and did not inhibit the crystal growth of the precipitated reactants.

The inventors have conducted further studies on a more suitable combination of reactants based on the above results and have found that the use of a specific cationic resin and a specific polyvalent metal salt in a specific proportion enables the recording of an image with excellent color development and image clarity.

That is, an ink jet recording method according to an embodiment of the present invention has the following features. An aqueous ink contains a coloring material that is dispersed by the action of an anionic group. An aqueous reaction liquid contains a water-soluble cationic resin having a structure of a quaternary ammonium salt, and a polyvalent metal salt. The mass ratio of the cationic resin content (% by mass) to the polyvalent metal salt content (% by mass) of the aqueous reaction liquid is 0.08 times or more to 0.80 times or less. The recoding medium is such that the amount of water absorbed by the recording medium from the start of contact to 30 $msec^{1/2}$ in the Bristow method is 10 $mL/m^2$ or less. The aqueous reaction liquid and the aqueous ink are applied to the recording medium so as to at least partially overlap each other. The inventors have speculated that the mechanism by which an image having excellent color development and image clarity can be recorded by the above-described configuration is as follows.

The ink contains the coloring material that is dispersed by the action of the anionic group. When the coloring material comes into contact with a reaction liquid described below, the coloring material can be reacted and aggregated by electrostatic interaction. In the case of a coloring material that is dispersed by the action of a nonionic group, the aggregation of the coloring material hardly proceeds, and thus, the color development and image clarity of an image cannot be obtained.

To inhibit the precipitation and crystal growth of the reactant on the surface of the recording medium, it is important that other components take up the cation or anion of the reactant present in the recording medium and inhibit the electrostatic interaction. The reaction liquid contains the water-soluble cationic resin having the structure of the quaternary ammonium salt, and the polyvalent metal salt. The cationic resin has a plurality of cationic sites in its molecular chain and can effectively trap the anion. The cationic resin has the structure of the quaternary ammonium salt as a cationic site. The quaternary ammonium salt is less likely to lose its cationic properties due to an environmental change, such as pH or temperature, and thus can easily exert its action without being impaired when comes into contact with the ink, thereby effectively trapping the anion of the residual reactant. This can improve the color development of the image. When the cationic sites of the cationic resin have only structures of primary to tertiary amines, the cationic properties may be impaired by an environmental change, such as pH or temperature, and the anion of the remaining reactant cannot be incorporated. This results in the precipitation and the crystal growth of the remaining reactant, thereby failing to obtain the color development of an image.

Since the cationic resin is water-soluble, the molecular chain of the cationic resin can freely move in an aqueous medium. Thus, it is considered that when the cationic resin comes into contact with the ink, the cationic resin reacts with an anion derived from the polyvalent metal salt to form a floc (lump), and thus the contact with a cation derived from the polyvalent metal salt can be physically inhibited. This can inhibit the precipitation and crystal growth of the polyvalent metal salt to improve the color development of an image. When the cationic resin is in the form of a resin particle, the molecular chain of the cationic resin is in a fixed state. For this reason, it is difficult to interact with an anion derived from the polyvalent metal salt, thereby failing to inhibit the precipitation and crystal growth of the polyvalent metal salt. As a result, the color development of the image is not obtained. When a weakly acidic organic acid typically used as a reactant is used instead of the polyvalent metal salt, it is difficult to incorporate an organic acid ion (anion) into the cationic resin, thereby failing to inhibit the precipitation and crystal growth of the remaining reactant. As a result, the color development of the image is not obtained.

As described above, when the cationic resin is used alone as a reactant, a large aggregate remains when the cationic resin reacts with the coloring material in the ink, causing a deterioration in the image clarity of an image. However, in the case where the cationic resin is used in combination with the polyvalent metal salt and where the mass ratio of the cationic resin content (% by mass) to the polyvalent metal salt content (% by mass) is 0.08 times or more to 0.80 times or less, the cation derived from the polyvalent metal salt is more likely to react with the coloring material than the cationic resin having a high molecular weight. This can inhibit the formation of a large aggregate by the cationic resin, improving the image clarity of an image. An amount of cationic resin (% by mass) of less than 0.08 times results in an insufficient amount of cationic resin that can interact with the anion derived from the polyvalent metal salt, failing to obtain the color development of the image. An amount of cationic resin (% by mass) of more than 0.80 times results in the rapid aggregation of the coloring material by the cationic resin to easily form a large aggregate, failing to obtain the image clarity.

Ink Jet Recording Method and Ink Jet Recording Apparatus

The ink jet recording method according to an embodiment of the present invention is a method in which an aqueous ink and an aqueous reaction liquid are discharged from a recording head of an ink jet system by the action of thermal energy and applied to a recording medium to record an image. The ink jet recording method according to an embodiment of the present invention includes a reaction liquid application step of applying the aqueous reaction liquid to the recording medium, and an ink application step of applying the aqueous ink in such a manner that the aqueous ink overlaps with at least part of a region of the recording medium to which the aqueous reaction liquid is applied. The aqueous ink contains a coloring material that is dispersed by the action of an anionic group. The aqueous reaction liquid contains a water-soluble cationic resin having a structure of a quaternary ammonium salt, and a polyvalent metal salt. The mass ratio of the cationic resin content (% by mass) to the polyvalent metal salt content (% by mass) of the aqueous reaction liquid is 0.08 times or more to 0.80 times or less. The recording medium is such that the amount of water absorbed by the recording medium from the start of contact to 30 $msec^{1/2}$ in the Bristow method is 10 $mL/m^2$ or less.

The ink jet recording apparatus according to an embodiment of the present invention is an apparatus for use in an ink jet recording method in which an aqueous ink and an aqueous reaction liquid are discharged from a recording head of an ink jet system by the action of thermal energy and applied to a recording medium to record an image. The apparatus can be used for the recording method. In the ink jet recording method and the ink jet recording apparatus according to embodiments of the present invention, it is not necessary to cure an image by irradiation with, for example, an activation energy ray.

The ink jet recording method and the ink jet recording apparatus according to embodiments of the present invention (hereinafter, also referred to simply as "the "recording method and the recording apparatus") will be described in detail below.

Figure 2:
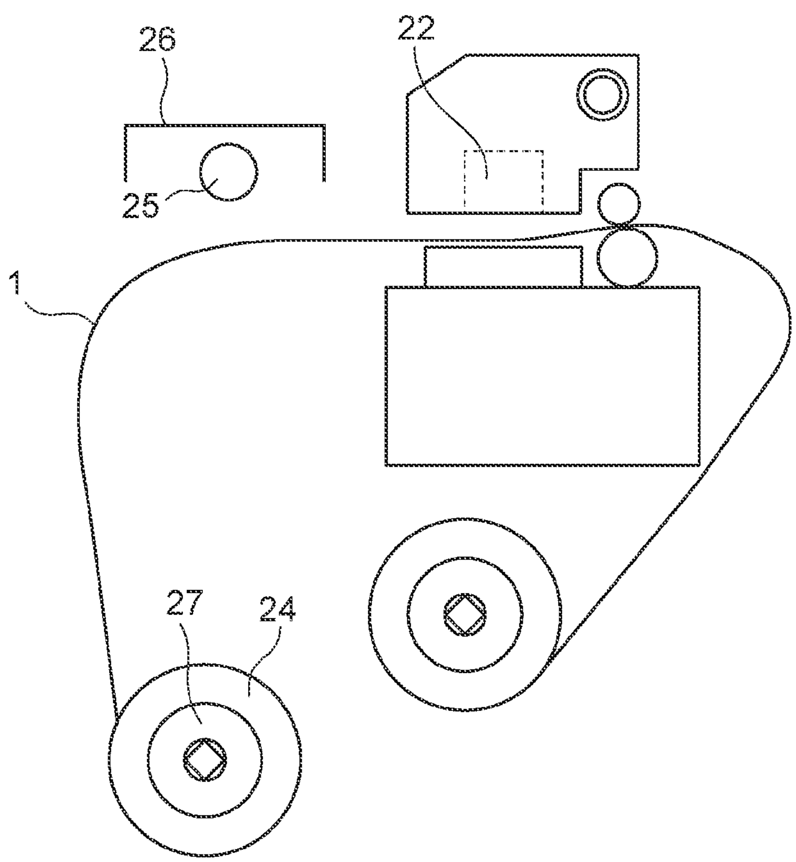
FIG. 2 is a schematic side view illustrating an ink jet recording apparatus according to an embodiment of the present invention.

FIG. 1 is a schematic perspective view illustrating an ink jet recording apparatus according to an embodiment of the present invention. FIG. 2 is a schematic side view illustrating an ink jet recording apparatus according to an embodiment of the present invention. As illustrated in FIGS. 1 and 2, the recording apparatus according to the present embodiment includes a recording head 22, configured to discharge ink, of an ink jet system. The recording head 22 is configured to discharge ink by the action of thermal energy. In a recording head configured to discharge ink by the action of thermal energy, an electric pulse is applied to an electro-thermal conversion element to apply thermal energy to ink, thereby discharging the ink from a discharge port. Here, the recording head configured to discharge an ink by the action of thermal energy is given as an example. However, a recording head configured to discharge ink by the action of mechanical energy may be used. The recording head may include a mechanism (temperature control mechanism) configured to heat the aqueous ink discharged from the recording head. When the temperature control mechanism is provided, the temperature of the ink discharged from the recording head can be 35° C. or higher to 70° C. or lower.

Heating Step

The recording method according to an embodiment of the present invention may include a step of heating (heat-treating) the recording medium to which the ink (and the reaction liquid) has been applied. Heating the recording medium to which the ink has been applied can promote drying and increase the strength of the image.

Examples of a unit configured to heat the recording medium include heating units, such as known warming units, e.g., heaters; air-blowing units using air blowing, e.g., dryers; and units obtained by combining these units. Examples of heating units include the above-described warming units; air-blowing units; and units obtained by combining these. Examples of the heat treatment method include a method in which heat is applied with, for example, a heater from the side (back surface) opposite to the recording surface (ink application surface) of the recording medium; a method in which warm air or hot air is applied to the recording surface of the recording medium; and a method in which heating is performed with an infrared heater from the recording surface or the back surface. Furthermore, two or more of them may be combined together.

The heating temperature of the recording medium to which the ink has been applied can be 50° C. or higher to 90° ° C. or lower because the scratch resistance of the image can be enhanced. The heating temperature of the recording medium to which the ink has been applied may be read by a sensor incorporated at a position corresponding to the heating unit of the recording apparatus, or may be determined from the relationship between the amount of heat and the temperature of the recording medium, the relationship having been determined in accordance with the types of inks and recording media.

In the recording apparatus illustrated in FIGS. 1 and 2, a heater 25 supported by a frame (not illustrated) is disposed at a position on the downstream side in a sub-scanning direction A with respect to a position at which the recording head 22 performs reciprocating scanning in a main scanning direction B. The recording medium 1 to which the ink has been applied is heated by the heater 25. Examples of the heater 25 include sheathed heaters and halogen heaters. The heater 25 is covered with a heater cover 26. The heater cover 26 is a member for efficiently irradiating the recording medium 1 with heat generated from the heater 25. The heater cover 26 is also a member for protecting the heater 25. The recording medium 1 to which the ink discharged from the recording head 22 has been applied is wound by a winding spool 27 to form a roll-shaped wound medium 24.

Recording Medium

In the recording method and the recording apparatus according to embodiments of the present invention, a low-absorbent or non-absorbent recording medium (low- to non-absorbent recording medium) is used. The low- to non-absorbent recording medium is a recording medium in which the amount of water absorbed from the start of contact to 30 $msec^{1/2}$ is 0 $mL/m^2$ or more to 10 $mL/m^2$ or less in the Bristow method described in "Liquid Absorbent Test Method for Paper and Paperboard" of JAPAN TAPPI Paper and Pulp Test Method No. 51. In an embodiment of the present invention, a recording medium satisfying the requirement of the amount of water absorbed is defined as a "low to non-absorbent recording medium". Recording media, such as glossy paper and mat paper, for ink jet recording having a coating layer (ink-receiving layer) formed of an inorganic particle and plain paper having no coating layer are "absorbent recording media", in which the amount of water absorbed is more than 10 $mL/m^2$.

Examples of the low- to non-absorbent recording medium that can be used include a plastic film; a recording medium with a plastic film bonded to the recording surface side of a base material; and a recording medium with a resin coat layer provided on the recording surface of a base material containing cellulose pulp. Among these, the plastic film can be used. The recording medium with the resin coating layer provided on the recording surface of the base material containing cellulose pulp can also be used. The recording medium in this specification indicates not a transfer body but a target recording medium on which an image is recorded as a recorded article.

Reaction Liquid

The recording method according to an embodiment of the present invention includes the reaction liquid application step of applying the aqueous reaction liquid containing the reactant that reacts with the aqueous ink to the recording medium. The reaction liquid application step can be performed before the ink application step. Alternatively, the ink application step and the reaction liquid application step can be performed simultaneously. Components and so forth used in the reaction liquid will be described in detail below.

Reactant

The reaction liquid reacts with the ink to aggregate a component, such as an anionic group-containing component, for example, a resin, a surfactant or a self-dispersible pigment, in the ink when the reaction liquid comes into contact with the ink. The reaction liquid contains a specific water-soluble cationic resin and a polyvalent metal salt, as reactants.

Cationic Resin

The reaction liquid contains the water-soluble cationic resin having the structure of the quaternary ammonium salt. Hereinafter, the water-soluble cationic resin having the structure of the quaternary ammonium salt is also referred to simply as a "cationic resin". The cationic resin has a plurality of cationic sites in its molecular chain. The cationic resin content (% by mass) of the reaction liquid is preferably 0.10% by mass or more to 10.00% by mass or less, more preferably 0.10% by mass or more to 5.00% by mass or less, based on the total mass of the reaction liquid. In particular, the content is preferably 0.10% by mass or more to 3.00% by mass or less.

In this specification, the term "water-soluble cationic resin" indicates that, when the resin is neutralized with an acid in an amount equimolar to the amine value, the resin is present in an aqueous medium in a state in which the resin does not form a particle having a particle size that can be measured by a dynamic light scattering method. The method for determining whether the resin is water-soluble will be described in detail below.

The counter ion of the cationic group of the cationic resin can be a chloride ion. It is considered that this is because the chloride ion has a small ion size as compared with, for example, an ethyl sulfate ion, which is a general-purpose counter ion of the cationic group, and thus is less likely to inhibit the interaction between the anion derived from the polyvalent metal salt and the cationic site of the cationic resin. As a result, the color development of an image can be further improved. The reaction liquid may contain, for example, an ethyl sulfate ion in addition to the chloride ion derived from the counter ion. The mole ratio of the amount (mol) of chloride ion in the reaction liquid to the amount (mol) of cationic group in the cationic resin is preferably 1.00 time or more, and preferably 2.00 times or less.

Examples of the cationic resin having the structure of the quaternary ammonium salt include resins each having the structure of vinylamine, allylamine, vinylimidazole, vinylpyridine, dimethylaminoethyl methacrylate, ethyleneimine, guanidine, diallyldimethylammonium chloride or an alkylamine-epichlorohydrin condensate. To form a quaternary ammonium salt, the resin having the above-described structure may be subjected to quaternization treatment. Among these, the cationic resin can be a dimethylamine·epichlorohydrin resin or a diallyldimethylammonium chloride resin. The dimethylamine·epichlorohydrin resin has a structure (dimethylamine-epichlorohydrin) represented by the following formula (1). The diallyldimethylammonium chloride resin has a structure (diallyldimethylammonium chloride) represented by the following formula (2). The cationic resin having the above-described structure has a high charge density and methyl groups as substituents and thus easily interacts with an anion derived from the polyvalent metal salt. This can efficiently inhibit the precipitation and crystal growth of the polyvalent metal salt, thereby further improving the color development of an image.

(1)

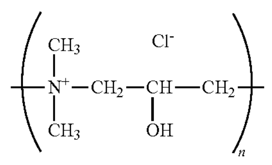

(2)

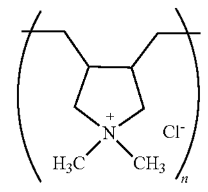

In formulae (1) and (2), n is a natural number.

The cationic resin can have a weight-average molecular weight of 8,500 or less. The weight-average molecular weight of the cationic resin can be measured, for example, by gel permeation chromatography in terms of pullulan. When the weight-average molecular weight of the cationic resin is more than 8,500, the molecular size of the cationic resin is too large, resulting in an uneven and pronounced appearance on the surface of the recording medium. Thus, the image may fail to have sufficient image clarity. The weight-average molecular weight of the cationic resin can be 1,000 or more.

The mass ratio of the cationic resin content (% by mass) to the polyvalent metal salt content (% by mass) of the reaction liquid described below is 0.08 times or more to 0.80 times or less. The mass ratio of the cationic resin content (% by mass) to the polyvalent metal salt content (% by mass) of the reaction liquid described below is preferably 0.10 times or more to 0.25 times or less. A mass ratio of less than 0.10 times may result in an insufficient amount of cationic resin that can inhibit the precipitation and crystal growth of the polyvalent metal salt to fail to obtain sufficient color development of an image. A mass ratio of more than 0.25 times may result in a too high proportion of the cationic resin; thus, the cationic resin may easily react with the components of the ink to form a large aggregate. Thus, the image may fail to have sufficient image clarity.

The degree of cationization (meq/g) of the cationic resin can be 4 meq/g or more. When the degree of cationization of the cationic resin is less than 4 meq/g, an interaction with an anion derived from the polyvalent metal salt described below is easily inhibited to fail to sufficiently inhibit the precipitation and crystal growth of the polyvalent metal salt. This may fail to obtain sufficient color development of an image. The degree of cationization of the cationic resin can be 7 meq/g or less. The degree of cationization is an index that indicates the degree of cationicity of the resin. A higher degree of cationization indicates a larger amount by mole of cationic group.

The degree of cationization of the cationic resin can be measured at 25° C. by colloid titration with an Automatic Potentiometric Titrator (trade name: AT-510, available from Kyoto Electronics Manufacturing Co., Ltd.) using a 1/400 N potassium polyvinyl sulfate solution (available from Fujifilm Corporation) as a titrant. The aqueous solution of the cationic resin used for the titration may be prepared by dissolving the cationic resin appropriately taken out from the reaction liquid in water.

Polyvalent Metal Salt

The reaction liquid contains the polyvalent metal salt. The polyvalent metal salt content (% by mass) of the reaction liquid is preferably 1.00% by mass or more to 20.00% by mass or less, more preferably 1.00% by mass or more to 5.00% by mass or less, based on the total mass of the reaction liquid. In particular, the content is preferably 1.00% by mass or more to 3.00% by mass or less. In this specification, the "polyvalent metal salt content (% by mass)" of the reaction liquid when the polyvalent metal salt is a hydrate indicates the "anhydrous polyvalent metal salt content (% by mass)" excluding water as a hydrate. The presence of the polyvalent metal salt allows a polyvalent metal ion formed by dissociation in the reaction liquid to interact with the anionic portion of the coloring material dispersed by the action of an anionic group, thereby destabilizing the dispersion state and causing the coloring material to aggregate.

Examples of the polyvalent metal ion include divalent metal ions, such as $Ca^{2+}$, $Cu^{2+}$, $Ni^{2+}$, $Mg^{2+}$, $Sr^{2+}$, $Ba^{2+}$ and $Zn^{2+}$; and trivalent metal ions, such as $Fe^{3+}$, $Cr^{3+}$, $Y^{3+}$ and $Al^{3+}$. To incorporate the polyvalent metal ion in the reaction liquid, a polyvalent metal salt, which may be a hydrate, having a polyvalent metal ion bonded to an anion can be used. Examples of the anion include inorganic anions, such as $Cl^-$, Br, $I^-$, $Cl^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$ and $H_2PO_4$; and organic anions, such as $HCOO^-$, $(COO^-)_2$, $COOH(COO^-)$, $CH_3COO^-$, $C_2H_5COO^-$. $CH_3CH(OH)COO^-$, $C_2H_4(COO^-)_2$, $C_6H_5COO^-$, $C_6H_4(COO^-)^2$ and $CH_3SO_3^-$.

The polyvalent metal salt can be a sulfate of a polyvalent metal. In particular, the polyvalent metal salt can be at least one selected from the group consisting of magnesium sulfate and aluminum sulfate. When the above-described polyvalent metal salt is used, a sulfate ion ionized in the reaction liquid easily interacts with the cationic site of the cationic resin and is easily trapped by the cationic resin, thus efficiently inhibiting the precipitation and crystal growth of the polyvalent metal salt. This can further improve the color development of an image.

A reactant other than the above-described reactants may be added to the reaction liquid as long as the color development and image clarity of an image are not impaired. Examples of the additional reactant include cationic resins (additional cationic resins) each having a structure of a primary to tertiary amine; and organic acids. The additional cationic resin content (% by mass) of the reaction liquid is preferably 0.10% by mass or more to 5.00% by mass or less, and more preferably 0.10% by mass or more to 3.00% by mass or less based on the total mass of the reaction liquid.

The organic acid-containing reaction liquid has a buffering ability in an acidic region (a pH of less than 7.0, preferably 2.0 to 5.0) and thus efficiently converts an anion group of a component present in the ink into an acid form to produce an aggregate. Examples of the organic acid include monocarboxylic acids, such as formic acid, acetic acid, propionic acid, butyric acid, benzoic acid, glycolic acid, lactic acid, salicylic acid, pyrrolecarboxylic acid, furancarboxylic acid, picolinic acid, nicotinic acid, thiophenecarboxylic acid, levulinic acid and coumaric acid, and salts thereof; dicarboxylic acids, such as oxalic acid, malonic acid, succinic acid, glutaric acid, adipic acid, maleic acid, fumaric acid, itaconic acid, sebacic acid, phthalic acid, malic acid and tartaric acid, and salts thereof and hydrogen salts thereof; tricarboxylic acids, such as citric acid and trimellitic acid, and salts thereof and hydrogen salts thereof; and tetracarboxylic acids, such as pyromellitic acid, and salts thereof and hydrogen salts thereof. The organic acid content (% by mass) of the reaction liquid can be 1.00% by mass or more to 50.00% by mass or less based on the total mass of the reaction liquid.

Aqueous Medium

The reaction liquid is an aqueous reaction liquid containing at least water as an aqueous medium. The aqueous medium used in the reaction liquid can contain a water-soluble organic solvent that can be contained in the ink and that will be described below.

Other Components

The reaction liquid may contain various other components, as needed. Examples of other components include the same components as other components that can be contained in the ink and that will be described below.

Physical Properties of Reaction Liquid

The reaction liquid used in the recording method according to an embodiment of the present invention is an aqueous reaction liquid for use in an ink jet system. Accordingly, the physical property values can be appropriately controlled from the viewpoint of reliability. Specifically, the surface tension of the reaction liquid at 25° C. can be 20 mN/m or more to 60 mN/m or less. The viscosity of the reaction liquid at 25° C. can be 1.0 mPa·s or more to 10.0 mPa·s or less. The pH of the reaction liquid at 25° C. is preferably 5.0 or more to 9.5 or less, more preferably 6.0 or more to 9.0 or less.

Ink

The ink used in the recording method according to an embodiment of the present invention is an aqueous ink for ink jet recording, the aqueous ink containing a coloring material that is dispersed by the action of an anionic group. Components and so forth contained in the ink will be described in detail below.

Coloring Material

The ink contains a coloring material that is dispersed by an anionic action. As the coloring material, a pigment can be used. The coloring material content (% by mass) of the ink is preferably 0.1% by mass or more to 15.0% by mass or less, more preferably 1.0% by mass or more to 10.0% by mass or less, based on the total mass of the ink.

Specific examples of the pigment include inorganic pigments, such as carbon black and titanium oxide; and organic pigments, such as azo, phthalocyanine, quinacridone, isoindolinone, imidazolone, diketopyrrolopyrrole and dioxazine pigments. These pigments may be used alone or in combination of two or more.

With regard to the mode of dispersion of the pigment, for example, a resin-dispersed pigment using a resin as a dispersant or a self-dispersible pigment in which a hydrophilic group is bonded to the particle surface of a pigment can be used. In addition, for example, a resin-bonded pigment obtained by chemically bonding an organic group containing a resin to the particle surface of a pigment or a microcapsule pigment obtained by covering the particle surface of a pigment with a resin or the like may be used. It is also possible to use a combination of pigments having different dispersion systems. Among these, instead of the resin-bonded pigment or microcapsule pigment, the resin-dispersed pigment in which a resin as a dispersant is physically adsorbed on the surface of a pigment particle can be used. That is, the pigment can be dispersed by a resin (resin dispersant) having an anionic group.

As the resin dispersant for dispersing the pigment in the aqueous medium, a resin dispersant that can disperse the pigment in the aqueous medium by the action of an anionic group is used. As the resin dispersant, a resin having an anionic group can be used, and a resin described below, particularly, a water-soluble resin can be used. The mass ratio of the pigment content (% by mass) of the ink to the resin dispersant content can be 0.3 times or more to 10.0 times or less.

As the self-dispersible pigment, one having an anionic group, such as a carboxylic acid group, a sulfonic acid group or a phosphonic acid group, bonded to the particle surface of a pigment directly or via another atomic group (—R—) may be used. The anionic group may be any of an acid form and a salt form. In the case of the salt form, the anionic group may be in any of a partially dissociated state and a completely dissociated state. When the anionic group is in a salt form, examples of the cation serving as a counter ion include an alkali metal cation; ammonium; and organic ammonium. Specific examples of the other atomic group (—R—) include a linear or branched alkylene group having 1 to 12 carbon atoms; an arylene group, such as a phenylene group or a naphthylene group; a carbonyl group; an imino group; an amide group; a sulfonyl group; an ester group; and an ether group. A combination of these groups may also be used.

The 50% cumulative particle size of the pigment in the ink on a volume basis is preferably 10 nm or more to 300 nm or less, more preferably 20 nm or more to 200 nm or less. The 50% cumulative particle size of the pigment on a volume basis is a diameter of a particle at which a cumulative value from the small particle size side reaches 50% based on the total volume of the measured particle in a particle size cumulative curve. The 50% cumulative particle size of the pigment on a volume basis can be measured based on a particle size analyzer and measurement conditions by a dynamic light scattering method described in the section of resin described below.

Resin

The ink may contain a resin. The resin can be added to the ink in order to (i) stabilize the dispersion state of the pigment, that is, as a resin dispersant or an auxiliary thereof. In addition, the resin can be added to the ink in order to (ii) improve various characteristics of an image to be recorded.

The resin content (% by mass) of the ink is preferably 0.1% by mass or more to 20.0% by mass or less, more preferably 0.5% by mass or more to 15.0% by mass or less, based on the total mass of the ink. Examples of the form of the resin include a block copolymer, a random copolymer, a graft copolymer and a combination thereof. The resin may be a water-soluble resin that can be dissolved in an aqueous medium, or may be a resin particle that is dispersed in an aqueous medium. These resins may be used alone or in combination of two or more.

Resin Composition

Examples of the resin include an acrylic resin, a urethane-based resin and an olefin resin. An acrylic resin or a urethane-based resin can be used. An acrylic resin composed of a unit derived from (meth)acrylic acid or (meth)acrylate can be used.

The acrylic resin can have a hydrophilic unit and a hydrophobic unit as constituent units. A resin having a hydrophilic unit derived from (meth)acrylic acid and a hydrophobic unit derived from at least one selected from the group consisting of an aromatic ring-containing monomer and a (meth)acrylate-based monomer can be used. In particular, a resin having a hydrophilic unit derived from (meth)acrylic acid and a hydrophobic unit derived from at least one monomer selected from the group consisting of styrene and α-methylstyrene can be used. These resins easily interact with a pigment and thus can be used as a resin dispersant for dispersing a pigment.

The hydrophilic unit is a unit having a hydrophilic group such as an anionic group. The hydrophilic unit can be formed, for example, by polymerizing a hydrophilic monomer having a hydrophilic group. Specific examples of the hydrophilic monomer having a hydrophilic group include acidic monomers each having a carboxylic acid group, such as (meth)acrylic acid, itaconic acid, maleic acid and fumaric acid; and anionic monomers, such as anhydrides and salts of those acidic monomers. Examples of a cation constituting the salt of the acidic monomer include a lithium ion, a sodium ion, a potassium ion, an ammonium ion and an organic ammonium ion. The hydrophobic unit is a unit free of a hydrophilic group, such as an anionic group. The hydrophobic unit can be formed, for example, by polymerizing a hydrophobic monomer having no hydrophilic group such as an anionic group. Specific examples of the hydrophobic monomer include monomers each having an aromatic ring, such as styrene, α-methylstyrene and benzyl (meth)acrylate; and (meth)acrylate monomers, such as methyl (meth)acrylate, butyl (meth)acrylate and 2-ethylhexyl (meth)acrylate.

The urethane-based resin can be prepared, for example, by reacting a polyisocyanate with a polyol. The urethane-based resin may be prepared by further subjecting a chain extender to a reaction with the polyisocyanate and the polyol. Examples of the olefin-based resin include polyethylene and polypropylene.

Properties of Resin

In the present specification, "a resin is water-soluble" indicates that when the resin is neutralized with an alkali equivalent to the acid value, the resin is present in an aqueous medium in a state in which the resin does not form a particle having a particle size that can be measured by a dynamic light scattering method. Whether the resin is water-soluble can be determined in accordance with the following method. First, a liquid (resin solid content: 10% by mass) containing a resin neutralized with an alkali, such as sodium hydroxide or potassium hydroxide, equivalent to its acid value is prepared. Subsequently, the prepared liquid is diluted 10 times (on a volume basis) with pure water to prepare a sample solution. Then, in the case where the particle size of the resin in the sample solution is measured by the dynamic light scattering method and where a particle having a particle size is not measured, the resin can be determined to be water-soluble. The measurement conditions at this time can be as follows: for example, SetZero: 30 seconds; the number of times of measurement: 3 times; and measurement time: 180 seconds. A particle size analyzer based on the dynamic light scattering method (e.g., trade name: "UPA-EX150", available from Nikkiso Co., Ltd.) or the like may be used as a particle size distribution measurement apparatus. Of course, the particle size distribution measurement apparatus, the measurement conditions and so forth are not limited to the foregoing.

The acid value of the water-soluble resin can be 100 mgKOH/g or more to 250 mgKOH/g or less. The weight-average molecular weight of the water-soluble resin can be 3,000 or more to 15,000 or less. The weight-average molecular weight of the water-soluble resin and the resin constituting the resin particle can be measured by gel permeation chromatography in terms of polystyrene.

The acid value of the resin constituting the resin particle can be 5 mgKOH/g or more to 100 mgKOH/g or less. The weight-average molecular weight of the resin constituting the resin particle is preferably 1,000 or more to 3,000,000 or less, more preferably 100,000 or more to 3,000,000 or less. The 50% cumulative particle size (D50) of the resin particle measured by a dynamic light scattering method on a volume basis can be 50 nm or more to 500 nm or less. The 50% cumulative particle size of the resin particle on a volume basis is a diameter of a particle at which the cumulative value from the small particle size side reaches 50% based on the total volume of the measured particle in a particle size cumulative curve. The 50% cumulative particle size of the resin particle on a volume basis can be measured based on the particle size analyzer and the measurement conditions by the dynamic light scattering method described above. The glass transition temperature of the resin particle is preferably 40° ° C. or higher to 120° C. or lower, more preferably 50° C. or higher to 100° C. or lower. The glass transition temperature (° C.) of the resin particle can be measured with a differential scanning calorimeter (DSC). The resin particle does not need to contain a coloring material.

Wax Particle

The ink can contain a particle composed of wax (wax particle). The use of the ink containing the wax particle can record an image having further improved abrasion resistance. The wax in this specification may be a composition in which a component other than the wax is blended, or may be the wax itself. The wax particle may be dispersed by a dispersant such as a surfactant or a water-soluble resin. The wax may be used alone or in combination of two or more. The wax particle content (% by mass) of the ink is preferably 0.1% by mass or more to 10.0% by mass or less, more preferably 1.0% by mass or more to 5.0% by mass or less, based on the total mass of the ink.

In a narrow sense, the wax is an ester of a fatty acid with a higher monohydric alcohol or dihydric alcohol insoluble in water, and includes an animal wax and a vegetable wax but includes no oil or fat. In a broad sense, the wax includes a high-melting-point fat, a mineral-based wax, a petroleum-based wax and a blend and a modified product of various waxes. In the recording method according to an embodiment of the present invention, any wax in a broad sense can be used without particular limitation. The wax in a broad sense can be classified into natural wax, synthetic wax, a blend thereof (blended wax) and a modified product thereof (modified wax).

Examples of the natural wax include animal-based wax, such as beeswax, spermaceti, or wool wax (lanolin); plant-based wax, such as Japan wax, carnauba wax, sugarcane wax, palm wax, candelilla wax, or rice wax; mineral-based wax, such as montan wax; and petroleum-based wax, such as paraffin wax, microcrystalline wax and petrolatum. Examples of the synthetic wax include hydrocarbon wax, such as Fischer-Tropsch wax and polyolefin wax, e.g., polyethylene wax and polypropylene wax. The blended wax is a mixture of the various waxes described above. The modified wax is prepared by subjecting the above-described various waxes to modification treatment, such as oxidation, hydrogenation, alcohol modification, acrylic modification or urethane modification. These waxes may be used alone or in combination of two or more. The wax can be at least one selected from the group consisting of microcrystalline wax, Fischer-Tropsch wax, polyolefin wax, paraffin wax, modified products thereof and blends thereof. Among these, a blend of a plurality of waxes can be used. A blend of petroleum-based wax and synthetic wax can be used.

The wax can be solid at room temperature (25° C.). The melting point (° C.) of the wax is preferably 40° ° C. or higher to 120° C. or lower, more preferably 50° C. or higher to 100° C. or lower. The melting temperature of the wax can be determined in accordance with a test method described in 5.3.1 (testing method for melting point) of JIS K 2235:1991 (Petroleum waxes). For microcrystalline wax, petrolatum and a mixture of a plurality of waxes, the melting point can be more accurately measured by a test method described in 5.3.2. The melting point of the wax is easily affected by properties, such as molecular weight (a higher molecular weight results in a higher melting point), molecular structure (a linear structure has a high melting point, and a branched structure has a lower melting point), crystallinity (a high crystallinity results in a higher melting point) and density (a higher density results in a higher melting point). Thus, wax having a desired melting point can be produced by controlling these properties. The melting point of the wax in the ink can be determined by, for example, subjecting the ink to ultracentrifugation treatment, washing and drying the separated wax, and then performing measurement in accordance with the above-described test method.

Aqueous Medium

The ink used in the recording method according to an embodiment of the present invention is an aqueous ink containing at least water as an aqueous medium. The ink can contain water or an aqueous medium that is a mixed solvent of water and a water-soluble organic solvent. Deionized water or ion-exchanged water can be used as the water. The water content (% by mass) of the aqueous ink can be 50.0% by mass or more to 95.0% by mass or less based on the total mass of the ink. The water-soluble organic solvent content (% by mass) of the aqueous ink can be 3.0% by mass or more to 50.0% by mass or less based on the total mass of the ink. Examples of the water-soluble organic solvent include alcohol, (poly)alkylene glycol, glycol ether, a nitrogen-containing solvent and a sulfur-containing solvent, which can be used in an ink for ink jet recording. These water-soluble organic solvents may be used alone or in combination of two or more.

Other Components

The ink may contain various other components as needed. Examples of the other components include various additives, such as a defoaming agent, a surfactant, a pH adjuster, a viscosity modifier, a rust inhibitor, a preservative, an antifungal agent, an antioxidant, and a reduction inhibitor. However, the ink can be free of a reactant contained in the reaction liquid.

The ink can contain a surfactant. The incorporation of a surfactant makes it easier for the ink to wet and spread on the recording medium, enabling the recording of an image having excellent color development and image clarity. The surfactant content (% by mass) of the ink is preferably 0.1% by mass or more to 5.0% by mass or less, more preferably 0.1% by mass or more to 2.0% by mass or less, based on the total mass of the ink. Examples of the surfactant include an anionic surfactant, a cationic surfactant and a nonionic surfactant. Among these, a nonionic surfactant can be used because the nonionic surfactant is less likely to affect other components and can efficiently facilitate wetting and spreading of the ink even in a small amount.

Physical Properties of Ink

The ink is an aqueous ink for use in an ink jet system. Thus, from the viewpoint of reliability, the physical property values can be appropriately controlled. Specifically, the surface tension of the ink at 25° C. can be 20 mN/m or more to 60 mN/m or less. The viscosity of the ink at 25° C. can be 1.0 mPa·s or more to 10.0 mPa·s or less. The pH of the ink at 25° C. is preferably 7.0 or more to 9.5 or less, more preferably 8.0 or more to 9.5 or less.

EXAMPLES

While the present invention will be described in more detail with reference to Examples and Comparative Examples, the present invention is not limited at all by the following Examples as long as the gist of the present invention is not exceeded. Regarding the amount of component, "part(s)" and "%" are based on mass unless otherwise specified.

Preparation of Cationic Resin

Cationic Resins 1 and 4 to 12

Table 1 presents the properties of cationic resins used in the preparation of reaction liquids. An appropriate amount of ion-exchanged water was added to each of the cationic resins to prepare a cationic resin-containing liquid having a resin content of 10.0% before use in the preparation of a corresponding one of the reaction liquids. In Table 1, "Classification" represents the classification of amine.

Cationic Resins 2 and 3

Liquids containing the cationic resins 2 and 3 were prepared as follows: A three-necked flask equipped with a stirrer was immersed in an ice bath, and 35.0 parts of ion-exchanged water and 100.0 parts of PAS-24 were placed in the three-necked flask and mixed. Furthermore, 1 mol/L hydrochloric acid was added, and the mixture was stirred for two hours. Thereafter, an appropriate amount of ion-exchanged water and an appropriate amount of hydrochloric acid described below were added to prepare a liquid containing a cationic resin having a resin content of 10.0%. The amounts of hydrochloric acid added were adjusted in such a manner that the mole ratios of the cationic group of the cationic resin to the chloride ion were 1.20 times and 2.00 times. Thereby, the respective liquids containing cationic resins 2 and 3 were prepared.

Cationic Resin 13

An appropriate amount of ion-exchanged water was added to an aqueous dispersion containing a cationic polyurethane resin particle (trade name: "Superflex 620", available from DKS Co. Ltd.) to prepare a cationic resin 13-containing liquid having a resin content of 10.0%.

TABLE 1

Properties of cationic resins

| Cationic resin | Trade name | Properties | | | | | |
|---|---|---|---|---|---|---|---|
| | | Form | Classification | Counter ion | Degree of cationization (meq/g) | Structure | Weight-average molecular weight |
| 1 | Catiomaster PD-7 (Yokkaichi Chemical Co., Ltd.) | water soluble | quaternary | chloride ion | 7 | dimethylamine· epichlorohydrin | 5,000 |
| 2 | PAS-24 (*1) (Nittobo Medical Co., Ltd.) | water soluble | quaternary | chloride ion | 5 | diallylmethylethylammonium chloride | 37,000 |
| 3 | PAS-24 (*1) (Nittobo Medical Co., Ltd.) | water soluble | quaternary | chloride ion | 5 | diallylmethylethylammonium chloride | 37,000 |
| 4 | PAS-24 (Nittobo Medical Co., Ltd.) | water soluble | quaternary | ethyl sulfate ion | 5 | diallylmethylethylammonium ethyl sulfate | 37,000 |
| 5 | PAS-J-41 (Nittobo Medical Co., Ltd.) | water soluble | quaternary | chloride ion | 4 | diallyldimethylammonium chloride acrylamide copolymer | 10,000 |
| 6 | PAS-A-5 (Nittobo Medical Co., Ltd.) | water soluble | quaternary | chloride ion | 3 | diallyldimethylammonium chloride sulfur dioxide copolymer | 4,000 |
| 7 | Unisence FPV 1000L (Senka Corp.) | water soluble | quaternary | methyl sulfate ion | 5 | quaternarized dimethylaminoethyl methacrylate | 50,000 |
| 8 | PAS-H-1L (Nittobo Medical Co., Ltd.) | water soluble | quaternary | chloride ion | 6 | diallyldimethylammonium chloride | 8,500 |
| 9 | Catiomaster PD-30 (Yokkaichi Chemical Co., Ltd.) | water soluble | quaternary | chloride ion | 7 | dimethylamine· epichlorohydrin | 9,000 |
| 10 | PAA-HCL-05 (Nittobo Medical Co., Ltd.) | water soluble | primary | chloride ion | 9 | allylamine hydrochloride | 5,000 |

TABLE 1-continued

| Properties of cationic resins | | | | | | | |
|---|---|---|---|---|---|---|---|
| | | Properties | | | | | |
| Cationic resin | Trade name | Form | Classification | Counter ion | Degree of cationization (meq/g) | Structure | Weight-average molecular weight |
| 11 | PAS-92 (Nittobo Medical Co., Ltd.) | water soluble | secondary | chloride ion | 5 | diallylamine hydrochloride | 5,000 |
| 12 | PAS-M-1L (Nittobo Medical Co., Ltd.) | water soluble | tertiary | chloride ion | 6 | methyldiallylamine hydrochloride | 5,000 |

(*1) The counter ion was changed to a chloride ion.

Preparation of Reaction Liquid

Components (unit: %) given in Tables 2 to 4 were mixed. The resulting mixtures were sufficiently stirred and subjected to pressure filtration through cellulose acetate filters (available from Toyo Roshi Kaisha, Ltd.) having a pore size of 3.0 μm to prepare respective reaction liquids. "BYK-348" is a trade name of a silicone-based nonionic surfactant available from BYK Japan KK. "Capstone FS3100" is a trade name of fluorine-based nonionic surfactant available from LEHVOSS Group. "Proxel GXL(S)" is a trade name of a preservative available from Arch Chemicals Inc.

TABLE 2

| Compositions and properties of reaction liquids | | | | | | | | | | | |
|---|---|---|---|---|---|---|---|---|---|---|---|
| | Reaction liquid | | | | | | | | | | |
| | 1 | 2 | 3 | 4 | 5 | 6 | 7 | 8 | 9 | 10 | 11 |
| Liquid containing cationic resin 1 | 3.50 | 3.50 | 3.50 | 8.00 | | | | | | | 1.60 |
| Liquid containing cationic resin 2 | | | | | | | 3.50 | | | | |
| Liquid containing cationic resin 3 | | | | | 3.50 | | | | | | |
| Liquid containing cationic resin 4 | | | | | | 3.50 | | | | | |
| Liquid containing cationic resin 5 | | | | | | | | 3.50 | | | |
| Liquid containing cationic resin 6 | | | | | | | | | 3.50 | | |
| Liquid containing cationic resin 7 | | | | | | | | | | 3.50 | |
| Liquid containing cationic resin 8 | | | | | | | | | | | |
| Liquid containing cationic resin 9 | | | | | | | | | | | |
| Liquid containing cationic resin 10 | | | | | | | | | | | |
| Liquid containing cationic resin 11 | | | | | | | | | | | |
| Liquid containing cationic resin 12 | | | | | | | | | | | |
| Liquid containing cationic resin 13 | | | | | | | | | | | |
| Magnesium sulfate heptahydrate | 4.10 | 4.10 | | 9.00 | 4.10 | 4.10 | 4.10 | 4.10 | 4.10 | 4.10 | 4.10 |
| Aluminum sulfate hexadecahydrate | | | 3.68 | | | | | | | | |
| Calcium acetate monohydrate | | | | | | | | | | | |
| Glutaric acid | | | | | | | | | | | |
| 1,2-Butanediol | 15.00 | 15.00 | 15.00 | 15.00 | 15.00 | 15.00 | 15.00 | 15.00 | 15.00 | 15.00 | 15.00 |
| BYK-348 | 0.50 | | 0.50 | 0.50 | 0.50 | 0.50 | 0.50 | 0.50 | 0.50 | 0.50 | 0.50 |
| Capstone FS3100 | | 0.30 | | | | | | | | | |
| Proxel GXL(S) | 0.20 | 0.20 | 0.20 | 0.20 | 0.20 | 0.20 | 0.20 | 0.20 | 0.20 | 0.20 | 0.20 |
| Ion-exchanged water | 76.70 | 76.90 | 77.12 | 67.30 | 76.70 | 76.70 | 76.70 | 76.70 | 76.70 | 76.70 | 78.60 |
| Polyvalent metal salt content M (%) | 2.00 | 2.00 | 2.00 | 4.40 | 2.00 | 2.00 | 2.00 | 2.00 | 2.00 | 2.00 | 2.00 |
| Cationic resin content C (%) | 0.35 | 0.35 | 0.35 | 0.80 | 0.35 | 0.35 | 0.35 | 0.35 | 0.35 | 0.35 | 0.16 |
| C/M value (times) | 0.18 | 0.18 | 0.18 | 0.18 | 0.18 | 0.18 | 0.18 | 0.18 | 0.18 | 0.18 | 0.08 |

TABLE 3

| Compositions and properties of reaction liquids | | | | | | | | | | |
|---|---|---|---|---|---|---|---|---|---|---|
| | Reaction liquid | | | | | | | | | |
| | 12 | 13 | 14 | 15 | 16 | 17 | 18 | 19 | 20 | 21 |
| Liquid containing cationic resin 1 | 1.80 | 2.00 | 5.00 | 5.10 | 16.00 | | | 3.50 | | 20.00 |
| Liquid containing cationic resin 2 | | | | | | | | | | |
| Liquid containing cationic resin 3 | | | | | | | | | | |
| Liquid containing cationic resin 4 | | | | | | | | | | |
| Liquid containing cationic resin 5 | | | | | | | | | | |
| Liquid containing cationic resin 6 | | | | | | | | | | |
| Liquid containing cationic resin 7 | | | | | | | | | 3.50 | |
| Liquid containing cationic resin 8 | | | | | | 3.50 | | | | |
| Liquid containing cationic resin 9 | | | | | | | 3.50 | | | |
| Liquid containing cationic resin 10 | | | | | | | | | | |
| Liquid containing cationic resin 11 | | | | | | | | | | |
| Liquid containing cationic resin 12 | | | | | | | | | | |
| Liquid containing cationic resin 13 | | | | | | | | | | |
| Magnesium sulfate heptahydrate | 4.10 | 4.10 | 4.10 | 4.10 | 4.10 | 4.10 | 4.10 | | | |
| Aluminum sulfate hexadecahydrate | | | | | | | | | | |
| Calcium acetate monohydrate | | | | | | | | 2.23 | 2.23 | |
| Glutaric acid | | | | | | | | | | |
| 1,2-Butanediol | 15.00 | 15.00 | 15.00 | 15.00 | 15.00 | 15.00 | 15.00 | 15.00 | 15.00 | 15.00 |
| BYK-348 | 0.50 | 0.50 | 0.50 | 0.50 | 0.50 | 0.50 | 0.50 | 0.50 | 0.50 | 0.50 |
| Capstone FS3100 | | | | | | | | | | |
| Proxel GXL(S) | 0.20 | 0.20 | 0.20 | 0.20 | 0.20 | 0.20 | 0.20 | 0.20 | 0.20 | 0.20 |
| Ion-exchanged water | 78.40 | 78.20 | 75.20 | 75.10 | 64.20 | 76.70 | 76.70 | 78.57 | 78.57 | 64.30 |
| Polyvalent metal salt content M (%) | 2.00 | 2.00 | 2.00 | 2.00 | 2.00 | 2.00 | 2.00 | 2.00 | 2.00 | 0.00 |
| Cationic resin content C (%) | 0.18 | 0.20 | 0.50 | 0.51 | 1.60 | 0.35 | 0.35 | 0.35 | 0.35 | 2.00 |
| C/M value (times) | 0.09 | 0.10 | 0.25 | 0.26 | 0.80 | 0.18 | 0.18 | 0.18 | 0.18 | — |

TABLE 4

| Compositions and properties of reaction liquids | | | | | | | | | | |
|---|---|---|---|---|---|---|---|---|---|---|
| | Reaction liquid | | | | | | | | | |
| | 22 | 23 | 24 | 25 | 26 | 27 | 28 | 29 | 30 | 31 |
| Liquid containing cationic resin 1 | | | 3.50 | | | | | | 1.50 | 16.10 |
| Liquid containing cationic resin 2 | | | | | | | | | | |
| Liquid containing cationic resin 3 | | | | | | | | | | |
| Liquid containing cationic resin 4 | | | | | | | | | | |
| Liquid containing cationic resin 5 | | | | | | | | | | |
| Liquid containing cationic resin 6 | | | | | | | | | | |
| Liquid containing cationic resin 7 | | | | | | | | | | |
| Liquid containing cationic resin 8 | | | | | | | | | | |
| Liquid containing cationic resin 9 | | | | | | | | | | |
| Liquid containing cationic resin 10 | | | | | 3.50 | | | | | |
| Liquid containing cationic resin 11 | | | | | | 3.50 | | | | |
| Liquid containing cationic resin 12 | | | | | | | 3.50 | | | |
| Liquid containing cationic resin 13 | | | | | | | | 3.50 | | |
| Magnesium sulfate heptahydrate | 4.10 | | | 4.10 | 4.10 | 4.10 | 4.10 | 4.10 | 4.30 | 4.10 |
| Aluminum sulfate hexadecahydrate | | | | | | | | | | |
| Calcium acetate monohydrate | | | | | | | | | | |
| Glutaric acid | | 2.00 | 2.00 | 0.30 | | | | | | |
| 1,2-Butanediol | 15.00 | 15.00 | 15.00 | 15.00 | 15.00 | 15.00 | 15.00 | 15.00 | 15.00 | 15.00 |
| BYK-348 | 0.50 | 0.50 | 0.50 | 0.50 | 0.50 | 0.50 | 0.50 | 0.50 | 0.50 | 0.50 |
| Capstone FS3100 | | | | | | | | | | |
| Proxel GXL(S) | 0.20 | 0.20 | 0.20 | 0.20 | 0.20 | 0.20 | 0.20 | 0.20 | 0.20 | 0.20 |
| Ion-exchanged water | 80.20 | 82.30 | 78.80 | 79.90 | 76.70 | 76.70 | 76.70 | 76.70 | 78.50 | 64.10 |
| Polyvalent metal salt content M (%) | 2.00 | 0.00 | 0.00 | 2.00 | 2.00 | 2.00 | 2.00 | 2.00 | 2.10 | 2.00 |
| Cationic resin content C (%) | 0.00 | 0.00 | 0.35 | 0.00 | 0.35 | 0.35 | 0.35 | 0.35 | 0.15 | 1.61 |
| C/M value (times) | 0.00 | — | — | 0.00 | 0.18 | 0.18 | 0.18 | 0.18 | 0.07 | 0.81 |

Preparation of Pigment Dispersion

Pigment Dispersion 1

A styrene-ethyl acrylate-acrylic acid copolymer (resin 1) having an acid value of 150 mgKOH/g and a weight-average molecular weight of 8,000 was prepared. Then 20.0 parts of resin 1 was neutralized with potassium hydroxide in an amount equimolar to the acid value thereof. An appropriate amount of pure water was added thereto to prepare an aqueous solution of resin 1, the solution having a resin content (solid content) of 20.0%. A mixture was prepared by mixing 20.0 parts of a pigment (carbon black), 50.0 parts of the aqueous solution of resin 1, and 30.0 parts of pure water. The resulting mixture and 200 parts of zirconia beads having a diameter of 0.3 mm were placed into a batch-type vertical sand mill (available from Aimex Co., Ltd.) and dispersed for 5 hours while the sand mill was cooled with water. After removing a coarse particle by centrifugation, pressure filtration was performed with a cellulose acetate filter (available from Toyo Roshi Kaisha, Ltd.) having a pore size of 3.0 μm to prepare pigment dispersion 1 having a pigment content of 15.0% and a resin dispersant (resin 1) content of 7.5%.

Pigment Dispersion 2

Pigment dispersion 2 having a pigment content of 15.0% and a resin dispersant (resin 1) content of 7.5% was prepared by the same procedure as that for pigment dispersion 1, except that the pigment was changed to C.I. Pigment Red 122.

Pigment Dispersion 3

Pigment dispersion 3 having a pigment content of 15.0% and a resin dispersant (resin 1) content of 7.5% was prepared by the same procedure as that for pigment dispersion 1, except that the pigment was changed to C.I. Pigment Yellow 74.

Pigment Dispersion 4

Pigment dispersion 4 having a pigment content of 15.0% and a resin dispersant (resin 1) content of 7.5% was prepared by the same procedure as that for pigment dispersion 1, except that the pigment was changed to C.I. Pigment Blue 15:3.

Pigment Dispersion 5

Pigment dispersion 5 having a pigment content of 15.0% and a resin dispersant (resin 2) content of 7.5% was prepared by the same procedure as that for pigment dispersion 1, except that resin 1 was changed to a butyl acrylate/benzyl methacrylate/methoxypolyethylene glycol monomethacrylate copolymer (resin 2, water-soluble resin, composition (mole ratio)=30.0/60.0/10.0, acid value: 0 mgKOH/g). As the methoxypolyethylene glycol monomethacrylate, trade name "Blemmer PME-400" (available from NOF Corporation, amount by mole of ethylene oxide group added: about 9) was used.

Production of Resin Particle

Resin Particle 1

In a four-necked flask equipped with a stirrer, a reflux condenser and a nitrogen gas inlet, 74.0 parts of ion-exchanged water and 0.2 parts of potassium persulfate were mixed. Furthermore, 24.0 parts of ethyl methacrylate, 1.5 parts of methacrylic acid and 0.3 parts of a reactive surfactant were mixed to prepare an emulsion. As the reactive surfactant, trade name "Adeka Reasoap ER20" (available from Adeka Corporation, nonionic surfactant, amount by mole of ethylene oxide group added: 20) was used. In a nitrogen atmosphere, the prepared emulsion was added dropwise to the four-necked flask over 1 hour, and a polymerization reaction was performed for 2 hours under stirring at 80° C. After cooling to 25° C., ion-exchanged water and an aqueous solution containing potassium hydroxide in an amount equimolar to the acid value of the resin particle were added thereto, thereby preparing an aqueous dispersion of resin particle 1, the aqueous dispersion having a resin particle content (solid content) of 25.0%.

Resin Particle 2

In a four-necked flask equipped with a stirrer, a reflux condenser and a nitrogen gas inlet, 81.8 parts of ion-exchanged water and 0.2 parts of potassium persulfate were mixed. Furthermore, 16.1 parts of ethyl methacrylate, 1.6 parts of methoxypolyethylene glycol methacrylate and 0.3 parts of the above reactive surfactant were mixed to prepare an emulsion. As the methoxypolyethylene glycol methacrylate, trade name "Blemmer PME-1000" (available from NOF Corporation, amount by mole of ethylene oxide group added: about 23) was used. In a nitrogen atmosphere, the prepared emulsion was added dropwise to the four-necked flask over 1 hour, and a polymerization reaction was performed for 2 hours under stirring at 80° C. After cooling to 25° C., ion-exchanged water was added thereto, thereby preparing an aqueous dispersion of resin particle 2, the aqueous dispersion having a resin particle content (solid content) of 25.0%.

Preparation of Ink

Components (unit: %) given in Table 5 were mixed. The resulting mixtures were sufficiently stirred and subjected to pressure filtration through cellulose acetate filters (available from Toyo Roshi Kaisha, Ltd.) having a pore size of 3.0 μm to prepare respective inks.

TABLE 5

Compositions of inks

| | Ink | | | | | | |
|---|---|---|---|---|---|---|---|
| | 1 | 2 | 3 | 4 | 5 | 6 | 7 |
| Pigment dispersion 1 | 35.00 | | | | 35.00 | 35.00 | |
| Pigment dispersion 2 | | 35.00 | | | | | |
| Pigment dispersion 3 | | | 35.00 | | | | |
| Pigment dispersion 4 | | | | 35.00 | | | |
| Pigment dispersion 5 | | | | | | | 35.00 |
| Aqueous dispersion of resin particle 1 | 32.00 | 32.00 | 32.00 | 32.00 | | 32.00 | 32.00 |
| Aqueous dispersion of resin particle 2 | | | | | 32.00 | | |
| 1,2-Butanediol | 20.00 | 20.00 | 20.00 | 20.00 | 20.00 | 20.00 | 20.00 |
| BYK-348 | 0.50 | 0.50 | 0.50 | 0.50 | 0.50 | | 0.50 |
| Capstone FS3100 | | | | | | 0.30 | |
| Ion-exchanged water | 12.50 | 12.50 | 12.50 | 12.50 | 12.50 | 12.70 | 12.50 |

Evaluation

The prepared reaction liquids and inks were filled into respective cartridges. The cartridges were set in an ink jet recording apparatus (trade name "imagePROGRAF PRO-2000", available from CANON KABUSHIKI KAISHA) equipped with a recording head configured to discharge an ink using thermal energy. In this recording apparatus, a heating device configured to dry a recording medium to which the reaction liquid and the ink were applied was incorporated at a position on the downstream side of the recording head in the conveyance direction of the recording medium. Then, the surface temperature of the recording medium was set to 80° ° C. by heating with the heating device. In the examples, an image recorded under the condition in which one ink droplet having a weight of 4.0 ng is applied to a unit region of 1/1,200 inch×1/1,200 inch is defined as a recording duty of 100%. The recording medium used was trade name "Scotchcal Graphic Film IJ1220-10"

(available from 3M, material: poly(vinyl chloride), amount of water absorbed from start of contact to 30 $msec^{1/2}$ in Bristow method is 0 $mL/m^2$ or more to 10 $mL/m^2$ or less). The recording environment was a temperature of 25° C. and a relative humidity of 50%. In the examples of the present invention, "AA", "A" and "B" were regarded as acceptable levels, and "C" was regarded as an unacceptable level in the evaluation criteria of the following items. The evaluation results are presented on the right side of Table 7.

Color Development

The reaction liquid and the ink given in Table 7 were applied using the ink jet recording apparatus to record a solid image at a recording duty of the ink of 200% and a recording duty of the reaction liquid of 50%. At this time, the reaction liquid application step and the ink application step were performed simultaneously to record the solid image. The lightness (L*) and chroma (C*) of each solid image were measured using a fluorescence spectroscopic densitometer (trade name "FD-7", available from Konica Minolta, Inc.). L* and C* are based on a color difference representation method specified by CIE. The color development of the image was evaluated in accordance with evaluation criteria given in Table 6. In the examples, a black ink was used when the coloring material was carbon black. A cyan ink was used when the coloring material was C.I. Pigment Blue 15:3. A magenta ink was used when the coloring material was C.I. Pigment Red 122. A yellow ink was used when the coloring material was C.I. Pigment Yellow 74. In the case of the black ink, lower lightness indicates that the image is darker and has better color development. In the case of the color ink (each of the cyan ink, magenta ink and yellow ink), higher chroma indicates that the image is more vivid and has better color development.

TABLE 6

Evaluation Criteria of Color Development in Accordance with Type of Ink

| Type of ink | Evaluation criteria | Evaluation |
|---|---|---|
| Black ink | The minimum value of lightness L* was 4.6 or less. | AA |
| | The minimum value of lightness L* was more than 4.6 to 4.9 or less. | A |
| | The minimum value of lightness L* was more than 4.9 to 5.2 or less. | B |
| | The minimum value of lightness L* was more than 5.2. | C |
| Cyan ink | The maximum value of chroma C* was 66 or more. | A |
| | The maximum value of chroma C* was less than 66. | C |
| Magenta ink | The maximum value of chroma C* was 79 or more. | A |
| | The maximum value of chroma C* was less than 79. | C |
| Yellow ink | The maximum value of chroma C* was 106 or more. | A |
| | The maximum value of chroma C* was less than 106. | C |

Image Clarity

Solid images each having a size of 2 cm×2 cm and each having a recording duty of the reaction liquid of 40% and a recording duty of the ink of 200% were recorded by applying the reaction liquid and the ink given in Table 7 using the ink jet recording apparatus. At this time, the reaction liquid application step and the ink application step were performed simultaneously to record the solid images. Thereafter, the solid images were left at 25° C. for 24 hours. The resulting solid images were attached to a test stand having a curvature radius of 200 mm and a test stand having a curvature radius of 60 mm. Two fluorescent lamps arranged in parallel at an interval of 10 cm were used as observation light sources. The images were illuminated with fluorescent light from a distance of 2 m at an angle of 45° (illumination angle: 45°). The shapes of the fluorescent lamps were projected on the images. The shapes of the fluorescent lamps projected on the images were visually observed at an angle of 45° (observation angle: 45°). The image clarity of each image was evaluated according to the following evaluation criteria.

A: The boundary between the two projected fluorescent lamps was recognized on each of the images attached to both test stands.

B: On the image attached to the test stand having a curvature radius of 200 mm, the boundary between the two projected fluorescent lamps was not recognized, whereas on the image attached to the test stand having a curvature radius of 60 mm, the boundary between the two projected fluorescent lamps was recognized.

C: The boundary between the two projected fluorescent lamps was not recognized on each of the images attached to both test stands.

TABLE 7

Evaluation criteria and evaluation results

| | | Evaluation condition | | Evaluation results | |
|---|---|---|---|---|---|
| | | Reaction liquid | Ink | Color development | Image clarity |
| Example | 1 | 1 | 1 | AA | A |
| | 2 | 1 | 2 | A | A |
| | 3 | 1 | 3 | A | A |
| | 4 | 1 | 4 | A | A |
| | 5 | 1 | 5 | AA | A |
| | 6 | 2 | 6 | AA | A |
| | 7 | 3 | 1 | AA | A |
| | 8 | 4 | 1 | AA | A |
| | 9 | 5 | 1 | A | B |
| | 10 | 6 | 1 | B | B |
| | 11 | 7 | 1 | A | B |
| | 12 | 8 | 1 | AA | B |
| | 13 | 9 | 1 | A | A |
| | 14 | 10 | 1 | B | B |
| | 15 | 11 | 1 | A | A |
| | 16 | 12 | 1 | A | A |
| | 17 | 13 | 1 | AA | A |
| | 18 | 14 | 1 | AA | A |
| | 19 | 15 | 1 | AA | B |
| | 20 | 16 | 1 | AA | B |
| | 21 | 17 | 1 | AA | A |
| | 22 | 18 | 1 | AA | B |

TABLE 7-continued

Evaluation criteria and evaluation results

| | | Evaluation condition | | Evaluation results | |
|---|---|---|---|---|---|
| | | Reaction liquid | Ink | Color development | Image clarity |
| | 23 | 19 | 1 | A | A |
| | 24 | 20 | 1 | B | B |
| Comparative example | 1 | 1 | 7 | — | — |
| | 2 | 21 | 1 | AA | C |
| | 3 | 22 | 1 | C | A |
| | 4 | 23 | 1 | C | A |
| | 5 | 24 | 1 | C | A |
| | 6 | 25 | 1 | C | A |
| | 7 | 26 | 1 | C | A |
| | 8 | 27 | 1 | C | A |
| | 9 | 28 | 1 | C | A |
| | 10 | 29 | 1 | C | A |
| | 11 | 30 | 1 | C | A |
| | 12 | 31 | 1 | AA | C |
| | 13 | 30 | 2 | C | A |
| | 14 | 30 | 3 | C | A |
| | 15 | 30 | 4 | C | A |
| | 16 | 31 | 2 | A | C |
| | 17 | 31 | 3 | A | C |
| | 18 | 31 | 4 | A | C |

In Comparative Example 1, an ink containing a coloring material dispersed by the action of a nonionic group was used. Thus, a solid image was not formed, and the above evaluation was not performed. For this reason, "–" is described in the column of the evaluation of each of the color development and the image clarity.

According to an embodiment of the present invention, it is possible to provide the ink jet recording method by which an image excellent in color development and image clarity can be recorded even when recording is performed on a non-absorbent recording medium using a reaction liquid. In addition, according to an embodiment of the present invention, it is possible to provide the ink jet recording apparatus used for the ink jet recording method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-187864 filed Nov. 25, 2022 and No. 2023-190123 filed Nov. 7, 2023, which are hereby incorporated by reference herein in their entirety.

What is claimed is:

1. An ink jet recording method for recording an image on a recording medium with an aqueous ink and an aqueous reaction liquid containing a reactant that reacts with the aqueous ink, the method comprising:

a reaction liquid application step of applying the aqueous reaction liquid to the recording medium; and an ink application step of applying the aqueous ink in such a manner that the aqueous ink overlaps with at least part of a region of the recording medium to which the aqueous reaction liquid is applied, wherein the aqueous ink comprises a coloring material that is dispersed by action of an anionic group, the aqueous reaction liquid comprises a water-soluble cationic resin having a structure of a quaternary ammonium salt, and a polyvalent metal salt, the polyvalent metal salt comprises a sulfate of a polyvalent metal, a mass ratio of an amount of the cationic resin (% by mass) contained in the aqueous reaction liquid to an amount of the polyvalent metal salt (% by mass) contained in the aqueous reaction liquid is 0.08 times or more to 0.80 times or less, and an amount of water absorbed by the recording medium from a start of contact to 30 $msec^{1/2}$ in a Bristow method is 10 $mL/m^2$ or less.

2. The ink jet recording method according to claim 1, wherein a counter ion of a cationic group of the cationic resin comprises a chloride ion.

3. The ink jet recording method according to claim 1, wherein a degree of cationization (meq/g) of the cationic resin is 4 meq/g or more.

4. The ink jet recording method according to claim 1, wherein the cationic resin comprises a dimethylamine·epichlorohydrin resin or a diallyldimethylammonium chloride resin.

5. The ink jet recording method according to claim 1, wherein the mass ratio of the amount of the cationic resin (% by mass) contained in the aqueous reaction liquid to the amount of the polyvalent metal salt (% by mass) contained in the aqueous reaction liquid is 0.10 times or more to 0.25 times or less.

6. The ink jet recording method according to claim 1, wherein the cationic resin has a weight-average molecular weight of 8,500 or less.

7. An ink jet recording apparatus used for recording an image on a recording medium with an aqueous ink and an aqueous reaction liquid containing a reactant that reacts with the aqueous ink, comprising:

a reaction liquid application unit configured to apply the aqueous reaction liquid to the recording medium; and an ink application unit configured to apply the aqueous ink in such a manner that the aqueous ink overlaps with at least part of a region of the recording medium to which the aqueous reaction liquid is applied, wherein the aqueous ink comprises a coloring material that is dispersed by action of an anionic group, the aqueous reaction liquid comprises a water-soluble cationic resin having a structure of a quaternary ammonium salt, and a polyvalent metal salt, the polyvalent metal salt comprises a sulfate of a polyvalent metal, a mass ratio of an amount of the cationic resin (% by mass) contained in the aqueous reaction liquid to an amount of the polyvalent metal salt (% by mass) contained in the aqueous reaction liquid is 0.08 times or more to 0.80 times or less, and an amount of water absorbed by the recording medium from a start of contact to 30 $msec^{1/2}$ in a Bristow method is 10 $mL/m^2$ or less.

8. The ink jet recording method according to claim 2, wherein a mole ratio of an amount of the chloride ion to an amount of the cationic group of the cationic resin is 1.00 time or more to 2.00 times or less.

9. The ink jet recording method according to claim 3, wherein the degree of cationization (meq/g) of the cationic resin is 7 meq/g or less.

10. The ink jet recording method according to claim 6, wherein the cationic resin has a weight-average molecular weight of 1,000 or more.

11. The ink jet recording method according to claim 1, wherein the amount of the cationic resin (% by mass)

contained in the aqueous reaction liquid is 0.10% by mass or more to 10.00% by mass or less, based on a total mass of the aqueous reaction liquid.

12. The ink jet recording method according to claim 1, wherein the amount of the polyvalent metal salt (% by mass) contained in the aqueous reaction liquid is 1.00% by mass or more to 3.00% by mass or less.

13. The ink jet recording method according to claim 1, wherein the coloring material comprises a pigment.

14. The ink jet recording method according to claim 1, wherein the coloring material that is dispersed by the action of the anionic group is at least one of (i) a pigment dispersed by a resin having an anionic group and (ii) a pigment having an anionic group bonded to a particle surface of the pigment directly or via another atomic group.

15. The ink jet recording method according to claim 1, wherein an amount of the coloring material (% by mass) contained in the aqueous ink is 0.1% by mass or more to 15.0% by mass or less based on a total mass of the aqueous ink.

16. The ink jet recording method according to claim 1, wherein the sulfate of the polyvalent metal comprises at least one selected from the group consisting of magnesium sulfate and aluminum sulfate.

17. The ink jet recording method according to claim 1, wherein the recording medium is a plastic film.

18. The ink jet recording method according to claim 1, further comprising a step of heating the recording medium having the reaction liquid and the aqueous ink applied thereto, wherein a heating temperature of the recording medium is 50° C. or higher to 90° C. or lower.

* * * * *